United States Patent Office 3,515,370
Patented June 2, 1970

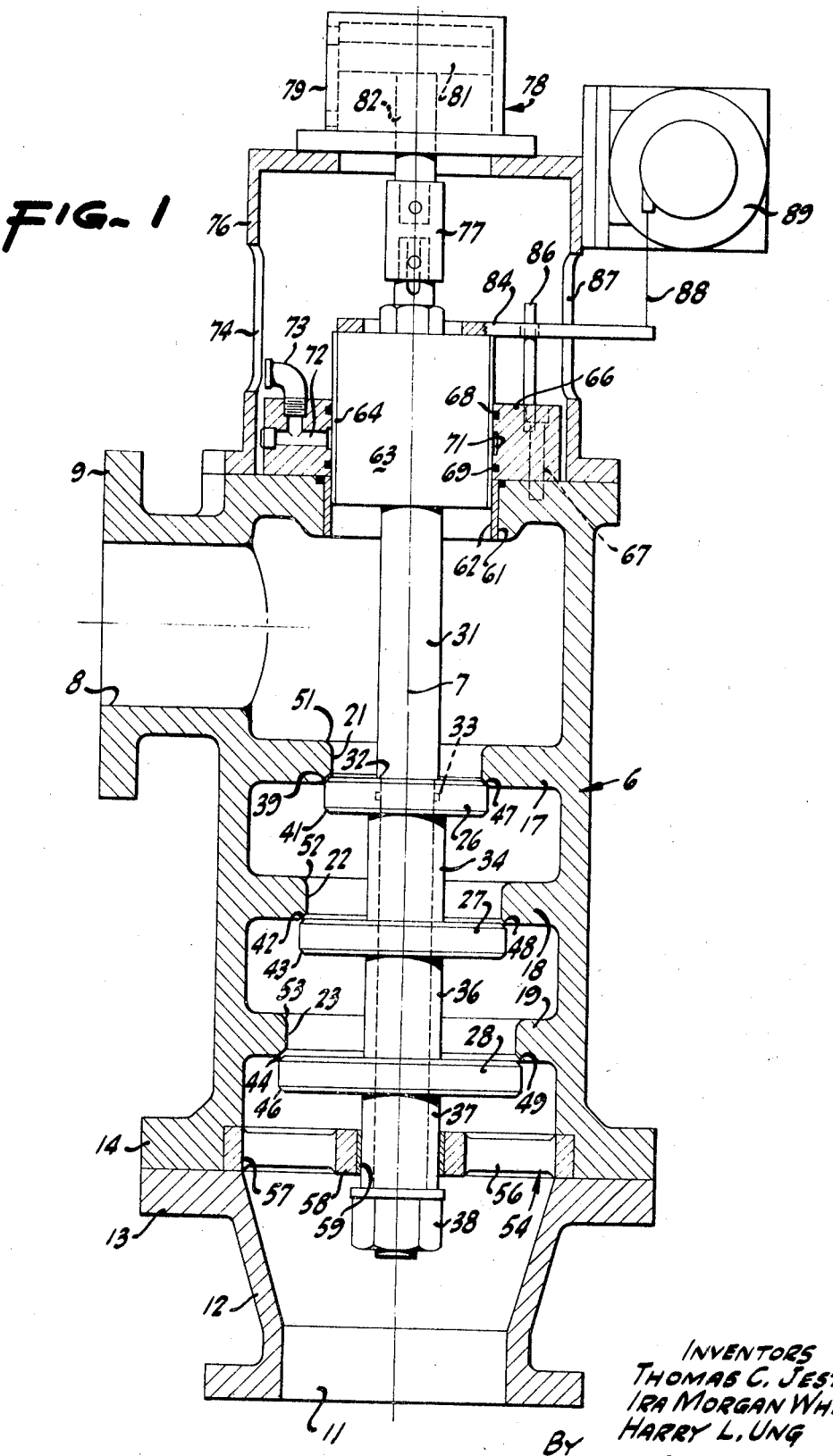

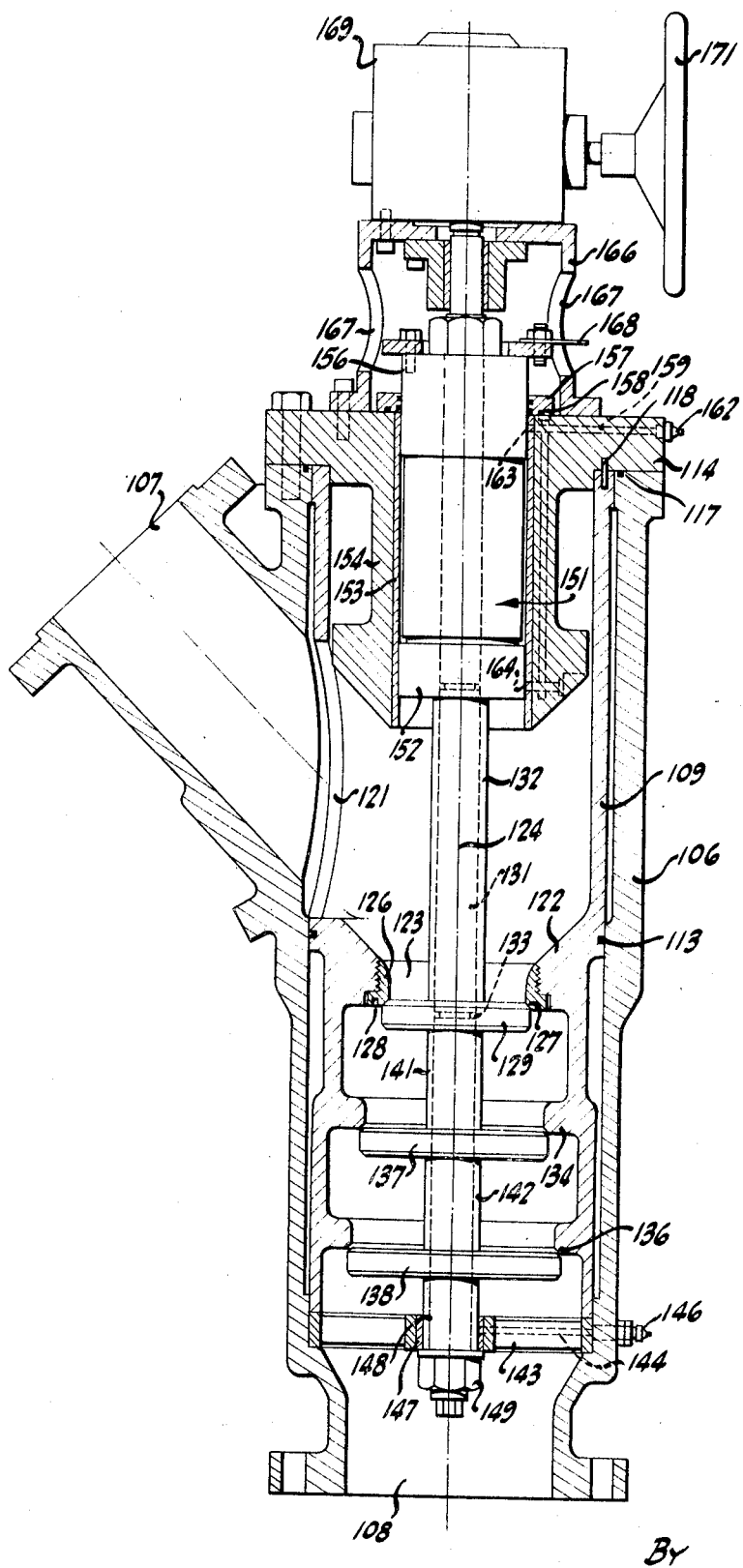

3,515,370
MULTISTAGE THROTTLE VALVE
Thomas C. Jester, Williamsport, and Ira Morgan White, Wallingford, Pa., and Harry L. Ung, South San Francisco, Calif., assignors to Baldwin-Lima-Hamilton Corporation, a corporation of Delaware
Filed May 1, 1967, Ser. No. 635,191
Int. Cl. F16k 5/10, 47/02
U.S. Cl. 251—120                                   2 Claims

ABSTRACT OF THE DISCLOSURE

A multistage throttling valve especially for hydraulic flow has a generally cylindrical housing with an inlet adjacent one end and an outlet at the other end. The interior of the housing is spanned by several valve plates having coaxial apertures therethrough of progressively larger sizes toward the outlet. An operating rod passes through said apertures and carries valve discs thereon adapted to be moved toward and away from said valve plates by an actuator on said housing and engaging said rod. A balancing piston on said rod is reciprocable in said housing adjacent said inlet.

---

Our invention relates to multistage throttle valves, an example of which is shown in the Rued Pat. 2,590,466.

In the handling of hydraulic fluids, particularly water, it is often desirable to reduce the available pressure of the water to a much lower value. This is done usually by throttling, but there is a difficulty in that flow rates are normally reduced considerably and a substantial pressure drop across a throttle is productive of a great deal of stress and wear and throttling valves for large pressure differences have a relatively severe service duty to perform.

It is therefore an object of our invention to provide a multistage throttle valve in which the pressure of the fluid flowing through the valve is reduced in successive steps by flow across a series of throttling orifices provided within a valve housing and subject to appropriate regulation without undue reduction in rate of flow.

Another object of the invention is to provide a multistage throttle valve in which the percentage of pressure reduction at each of the stages is approximately the same as the pressure reduction or drop at the other stages in order to distribute the stresses and wear over various parts of the valve.

Another object of the invention is to provide a multistage throttle valve which is effective not only to provide certain pressure drops during fluid flow, but also has the capability of shutting off flow completely.

Another object of the invention is to provide a close control of pressure drop in a fluid passage.

Another object of the invention is in general to provide a multistage throttle valve of improved characteristics.

Other objects together with the foregoing are attained in the embodiments of the invention described in the accompanying description and illustrated in the accompanying drawings, in which:

FIG. 1 is for the most part a cross section on a longitudinal transverse plane through one form of multistage thortle valve constructed pursuant to the invention; and FIG. 2 is for the most part a cross section on an axially extending transverse plane through another form of multistage throttle valve pursuant to our invention.

While the multistage throttle valve can be embodied in a number of different ways, particularly dependent upon the nature of the service for which it is designed, it has been incorporated in two exemplary forms as disclosed herein. In the form shown in FIG. 1, there is provided a valve housing 6 preferably of cast material and of generally circular cylindrical configuration about a central axis 7. The housing 6 adjacent one end has a fluid or liquid inlet 8 provided with a surrounding flange 9 for connection to an inlet pipe, not shown, carrying fluid, usually liquid, at a relatively high pressure. The housing 6 at its other end has an outlet opening 11 preferably formed within a discharge reducer 12 connected to the main body of the housing 6 by appropriate flanges 13 and 14 secured by connectors or fastenings, not shown. Discharge can be to the atmosphere or to a connected conduit.

Preferably incorporated integrally with the housing 6 is a plurality of valve plates 17, 18 and 19 each of which spans the interior chamber of the housing 6 and is formed with a respective one of a number of successive apertures 21, 22 and 23 so that when the apertures are unobstructed there can be continuous flow from the inlet opening 8 through the housing 6 to the outlet 11. The various apertures 21, 22 and 23 are progressively larger in the direction of the outlet 11; that is, the upstream aperture 21 has the smallest area, the intermediate aperture 22 has an intermediate area, while the downstream aperture 23 has the largest area.

Designed to cooperate with the various valve plates 17, 18 and 19 is a corresponding plurality of valve discs 26, 27 and 28. Each of these discs is slightly larger than its associated one of the apertures 21, 22 and 23 and is carried by or mounted upon an operating rod 31 extending along the axis 7. The rod 31 is provided with a shoulder 32 against which the disc 26 abuts, there being an O-ring 33 interposed between the disc and the rod to preclude leakage. Intermediate the disc 26 and the disc 27 is a spacer 34 surrounding the rod 31 and between the discs 27 and 28 a similar spacer 36 surrounds the rod. Finally, a spacer 37 abuts the disc 28 and is engaged by a securing nut 38 threaded onto the end of the rod 31. When the disc 26 is in engagement with the plate 17, the disc 27 is slightly out of engagement with the plate 18 by reason of the fact that the spacer 34 disposes the discs 26 and 27 slightly farther apart than the plates 17 and 18. Similarly, the spacer 36 holds the discs 27 and 28 slightly farther apart than the distance between the plates 18 and 19. Consequently, when the disc 26 is seated, the disc 27 is slightly off of its seat and the disc 28 is farther off of its seat.

In order to afford appropriate seating abutments, the disc 26 on both its upstream and downstream faces is provided with bevel edges 39 and 41. The disc 27 has similarly bevelled edges 42 and 43, while the disc 28 also has bevelled edges 44 and 46. There are matching bevels 47, 48 and 49 on the downstream edges of the plates 17, 18 and 19. The discs can be turned over on the rod after the initially effective seats have been worn. Preferably the upstream edges of all of the plates are provided with rounded inlet edges 51, 52 and 53.

In order appropriately to position the rod 31 within the casing 6, there is provided adjacent the outlet a spider 54 having a number of radial arms 56 joining the rim 57 of the spider to a ring 58 adjacent the center thereof. An antifriction bushing 59 lines the ring 58 in immediate contact with the spacer 37 so that the rod can move freely within the housing 6. The spacer or spider 54 is clamped in position between the flanges 13 and 14.

Adjacent the inlet end, the housing 6 is reduced in diameter to provide a cylindrical surface 61 lined with a cylindrical bushing 62 within which a balancing piston 63 is reciprocable. The piston is fast on the rod 31 and preferably has a hardened surface 64 to reduce wear. The piston emerges from a portion of the housing 6 through a sealing plate 66 held to the housing end by fastenings 67. A pair of spaced packing rings 68 and 69 are fitted into the plate 66 and between them a bleed channel 71 is afforded. A duct 72 joins the channel with a drain pipe 73 discharging through an opening 74 in a support cage 76 fastened on the end of the housing 6. The diameter of the balancing piston 63 is substantially or approximately the same as the diameter of the valve disc 26. When the valve disc 26 is seated, the hydraulic pressure tending to force the disc 26 toward valve open position and tending to force the piston 63 toward valve closed position is substantially the same, so that there is no net force available on the end of the rod 31.

Connected to the end of the rod 31 by means of a coupling 77 is a hydraulic actuating mechanism 78. This includes a cylinder 79 secured to the cage 76 by fastenings (not shown) and also includes an internal piston 81 having a piston rod 82 secured to the coupling 77. Appropriate hydraulic controlling mechanism (not shown) is connected to the cylinder 79 and when appropriately actuated moves the piston 81 either toward open position or toward closed position. Because of the balancing piston arrangement, the force required on the piston 81 is relatively small. Since the piston 81 is actuated by a hydraulic system, it is readily moved into any selected position and is then held or locked in such position.

As an indication of the internal position of the various discs, particularly the disc 26, there is secured to the piston 63 an indicator arm 84 overlying an indicator rod 86 having various indicia thereon. The arm 84 extends through another one of the openings 87 in the cage 76 to connect to an actuating cable 88. This is joined to a potentiometer 89 or a comparable mechanism mounted on the cage 76 and effective to afford a remote indication of the position of the valve rod 31, for example.

In the operation of this form of the device, when the piston 81 is in its extreme position, the disc 26 is seated and there is no flow through the throttle valve. However, when the piston 81 is moved toward open position, the rod 31 is translated along the axis 7 and opens the throttle disc 26 in a corresponding amount. The other throttle discs 27 and 28 are simultaneously moved the same axial amount, but since their diameters are larger and since they are already partly off their seats, the amount or percentage of throttling across each one of the apertures 21, 22 and 23 is approximately the same as the throttling across the other apertures. Thus the liquid leaving the aperture 23 and emerging from the outlet 11 is at a pressure substantially less than the pressure at which it entered the inlet 8. Preferably, as the piston 81 moves farther and farther toward open position, the same general ratio of throttling at each of the apertures 21, 22 and 23 is substantially maintained. In this fashion, the stresses on the mechanism and the wear thereon are all distributed over the various throttling orifices and discs.

In the form of construction shown in FIG. 2, a somewhat heavier-duty arrangement is provided. In this instance, a valve housing 106 has an inlet 107 adjacent one end and an outlet 108 adjacent the other end. Within the housing there is disposed a separate sleeve 109 held in position against a spider 111 resting on a shoulder 112 adjacent the outlet. The central portion of the sleeve 109 is in engagement with the housing interior near the inlet, leakage being precluded by an interposed O-ring 113. Adjacent its other end the sleeve 109 is positioned by an end cap 114 held by appropriate fasteners 116, there being an intervening sealing ring 117 to preclude leakage. Rotation of the sleeve within the housing is precluded by a pin 118 engaging the cap 114 and the end of the sleeve.

Between its ends the sleeve has a lateral inlet opening 121 registering approximately with the inlet passage 107. The sleeve likewise has an upstream valve plate 122 formed as part of the sleeve and having an appropriate contour for smooth water flow. The plate 122 defines an aperture 123 concentric with the central axis 124 of the housing 106 and of the sleeve 109. In this particular location, although hard facing can be employed directly on the boundary of the aperture, it is preferred to introduce a threaded bushing 126 of wear-resistant material contoured for good fluid flow and having a bevel seat 127. Recesses 128 in the bushing are for the reception of a spanner wrench.

Cooperating with the seat 127 is a valve disc 129 disposed on a shaft 131 extending along the axis 124 and positioned by a sleeve 132. An O-ring 133 precludes leakage through the center of the disc 129. Similarly, valve plates 134 and 136 span the interior of the housing and cooperate with valve discs 137 and 138 respectively. The various valve discs 129, 137 and 138 are held apart by spacers 141 and 142 in order that the distance from their respective seats is held to a desired amount, preferably an increasing amount toward the outlet. In a fashion like that of the FIG. 1 embodiment, the rod 131 is guided adjacent the outlet in a spider 143. In this instance, a lubricating channel 144 is provided in the spider and extends from an external fitting 146 to a bushing 147 around a spacer 148 between the disc 138 and an end fastener 149.

Adjacent the inlet end, the rod 131 is connected to a balancing piston 151 having an enlarged cylindrical surface 152 reciprocable on a liner 153 within an extension 154 of the closure 114. The piston 151 is relieved between its ends and terminates in an enlarged portion 156 emerging from the end cap 114 through a sealing disc 157 carrying sealing rings 158. Lubricating channels 159 extend through the end cap 114 from an external fitting 162 to passages 163 and 164 extending to the bearing surfaces.

Upstanding from the closure 114 is a mounting spool 166 having openings 167 therein through which an indicator arm 168 extends. An actuator 169 is mounted on the end of the spool 166 and engages the end of the rod 131. A hand wheel 171 when turned moves the rod to and fro and thus changes the location of the various discs 129, 137 and 138. In this way the multistage throttle valve is actuated for performance characteristics similar to those of the valve shown in FIG. 1.

What is claimed is:

1. A multistage throttle valve comprising a valve housing extending along an axis and having a lateral inlet adjacent one end and an outlet at the other end, a valve plate extending across the interior of said housing adjacent said inlet, a plurality of throttling plates extending across the interior of said housing, said valve plate and each of said throttling plates having a circular aperture therein, said apertures in each of said plates being of its own predetermined diameter and said diameters increasing from said inlet toward said outlet, a valve disc, a plurality of throttling discs, said valve disc being disposed between said valve plate and said outlet and each of said throttling discs being disposed between a respective one of said throttling plates and said outlet, each of said discs having its own diameter smaller than the diameter of the adjacent downstream plate and larger than the diameter of the adjacent upstream plate, an operating rod disposed axially of said housing and fixedly engaging all of said discs, means on said housing and engaging said operating rod for moving said operating rod and said discs simultaneously toward and away from said outlet, a balancing cylinder in a wall of said housing adjacent said inlet and opposite said outlet and concentric with said axis, and a balancing piston fast on said rod and reciprocable within said balancing cylinder.

2. A multistage throttling valve as in claim 1 in which said throttling plates are spaced closer together axially than said throttling discs, the spacing between each of said throttling plates and its respective throttling disc being such as to produce proportionate throttling of flow through said valve between each of said throttling plates and its respective throttling disc.

References Cited

UNITED STATES PATENTS

| | | | |
|---|---|---|---|
| 1,112,050 | 9/1914 | Berberich | 251—210 |
| 2,564,287 | 8/1951 | Stephany | 251—127 XR |
| 2,484,199 | 10/1949 | Walger | 251—282 X |
| 3,243,157 | 3/1966 | Beck | 251—122 |

FOREIGN PATENTS

| | | |
|---|---|---|
| 798,090 | 7/1958 | Great Britain. |
| 584,729 | 11/1958 | Italy. |
| 371,934 | 10/1963 | Switzerland. |
| 520,187 | 3/1931 | Germany. |

HENRY T. KLINKSIEK, Primary Examiner